May 18, 1943.  A. G. HAZEN  2,319,456
MATERIAL HANDLING DEVICE
Filed March 26, 1942   2 Sheets-Sheet 1
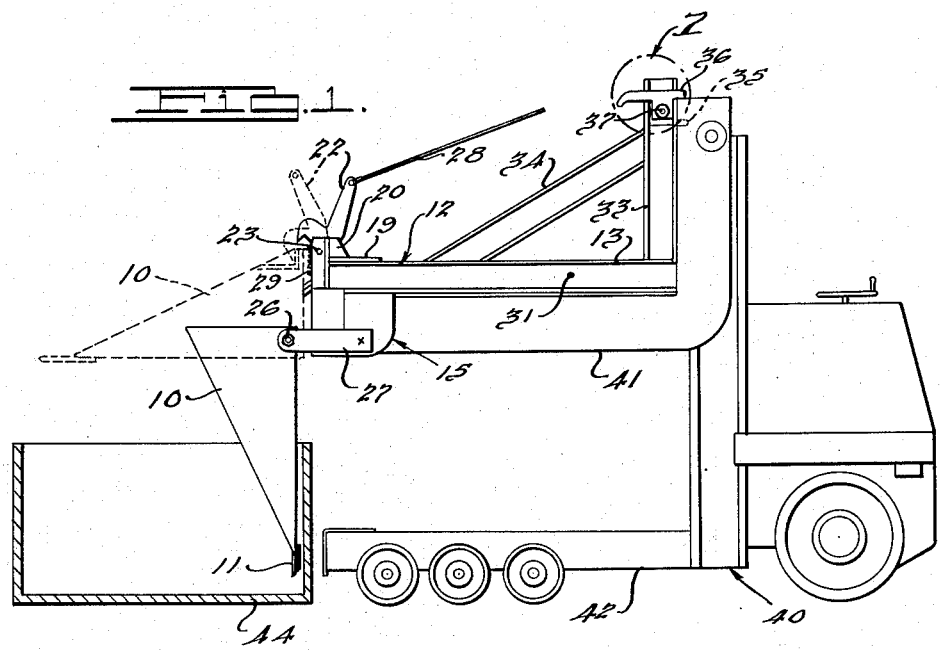
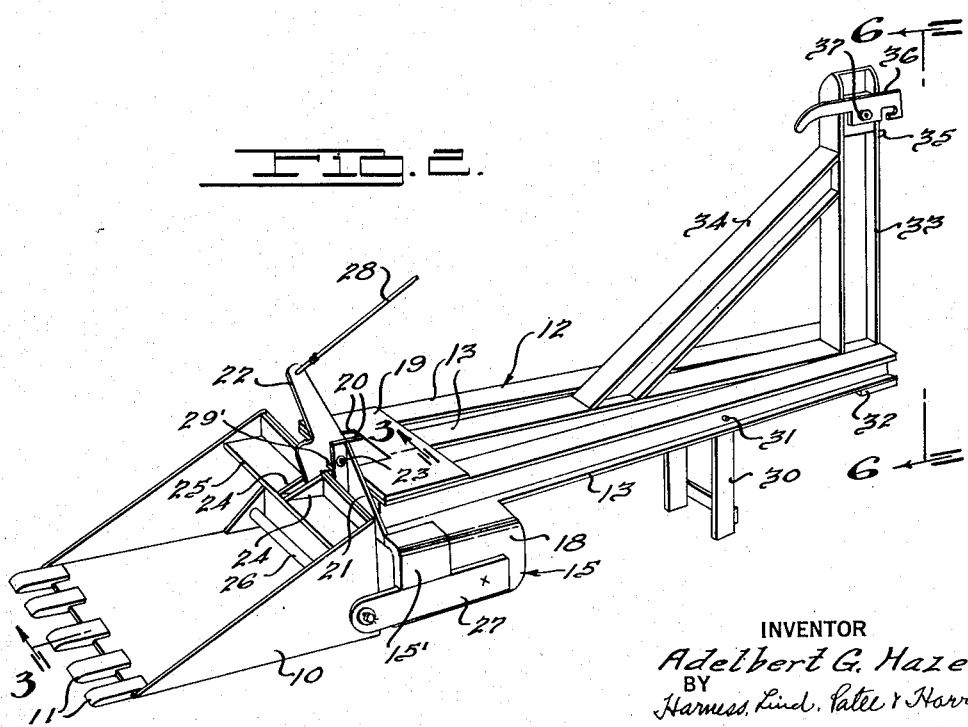
INVENTOR
Adelbert G. Hazen.
BY
Harness, Lind, Patee & Harris
ATTORNEYS.

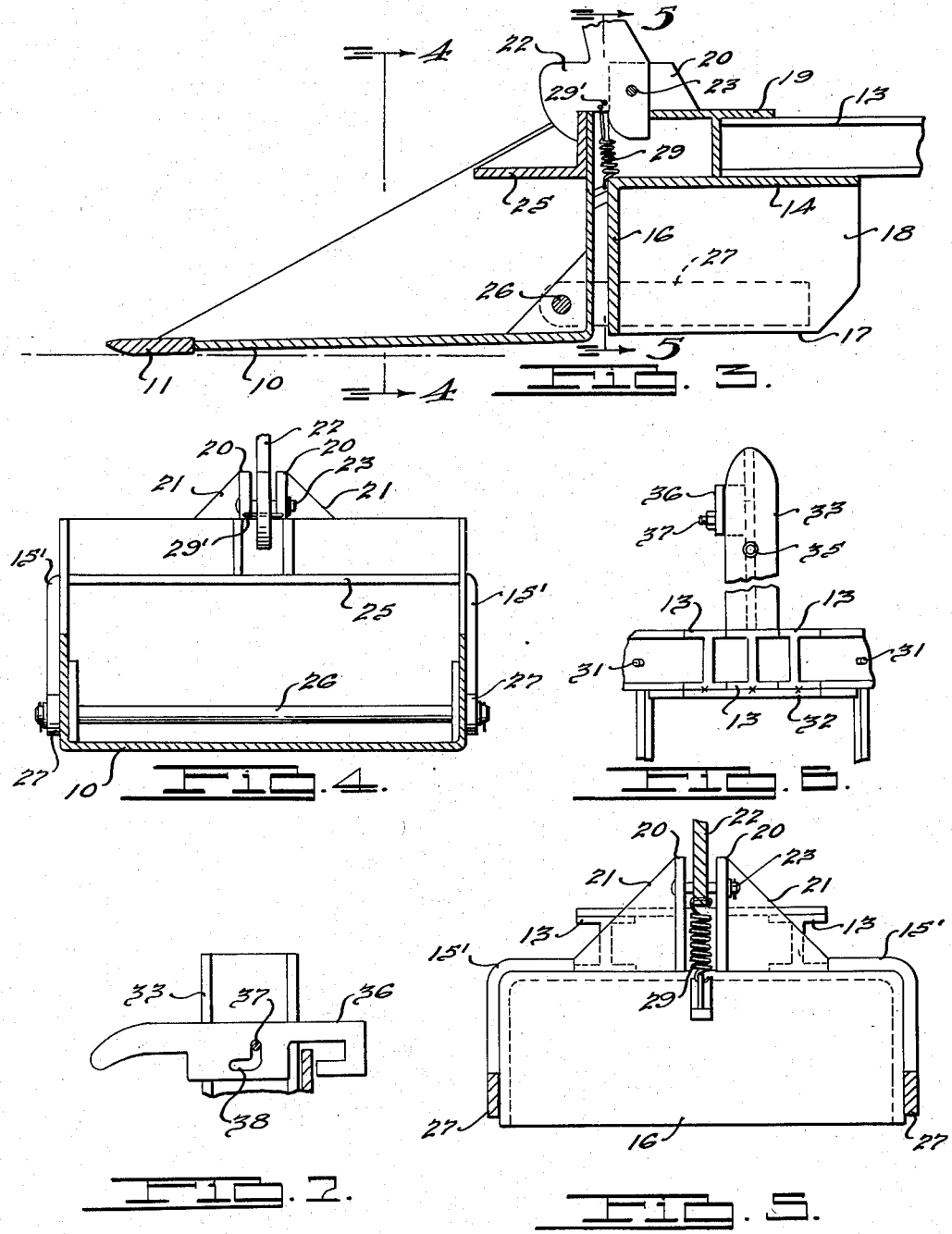

Patented May 18, 1943

2,319,456

UNITED STATES PATENT OFFICE 2,319,456

MATERIAL HANDLING DEVICE

Adelbert G. Hazen, Centerline, Mich., assignor to Chrysler Corporation, Highland Park, Mich., a corporation of Delaware Application March 26, 1942, Serial No. 436,237

7 Claims. (Cl. 214—121)

This invention relates to a material handling device of the scoop type adapted for operation by an industrial truck.

An object of the invention is the provision of an improved material handling device which can be conveniently adapted to an industrial truck of the type having a lifting platform for operation thereby and to provide means for preventing undesired movement of the device relative to and separate from the truck.

A further object of the invention is to provide a device of this type including a frame structure having a scoop shovel pivotally mounted at one end thereof and supports positioning the frame structure in spaced relation to a base surface to accommodate insertion of the truck platform beneath the structure; to provide a support as aforesaid which is positioned to receive thrust from the platform for moving the frame structure with the latter in a direction parallel to the base surface and which cooperates with the platform to prevent undesired shifting of the frame structure laterally with respect to the platform; and to provide a further support so disposed as to be moved from its supporting position by the platform as the latter is inserted beneath the frame structure and to be returned to its supporting position as the platform is withdrawn from the latter structure.

A further object of the invention is the provision of a device according to the foregoing including a frame structure adapted to seat upon the truck platform together with improved means cooperating with the frame and platform for preventing tilting of the former about an axis transverse to the platform and improved means for preventing unintended unseating of the frame structure when the platform is moved horizontally. In carrying out the foregoing object, the frame and platform include vertically disposed parts having the means for preventing the tilting and the unseating as aforesaid, the vertical part of the platform abutting an end of the frame structure for thrusting the latter in a direction to load the scoop.

Other advantages of the invention will be more apparent from the following description taken in connection with the accompanying drawings, in which:

Fig. 1 is a side elevational view of the improved device adapted to an industrial truck.

Fig. 2 is an enlarged view in perspective of the device shown in Fig. 1.

Fig. 3 is a sectional side elevational view taken as indicated by the line 3—3 of Fig. 2.

Fig. 4 is a view partly in section taken on the line 4—4 of Fig. 3.

Fig. 5 is an elevational view partly in section taken as indicated by the line 5—5 of Fig. 3.

Fig. 6 is a fragmentary end elevational view as indicated by the line 6—6 of Fig. 2.

Fig. 7 is an enlarged fragmentary view showing the parts within the circle 7 of Fig. 1.

Referring to the drawings, and particularly Fig. 2, the device includes a scoop 10 for receiving material to be handled and which is movable on the base surface in ordinary practice for loading purposes and is provided with fingers 11 to facilitate the latter action. The scoop is operatively attached to a frame structure, generally designated by the numeral 12, including the three rails 13, herein illustrated as of the I-beam type as more particularly shown in Fig. 6, although it will be understood that these rails may be otherwise shaped, if desired. The forward ends of the rails are spaced laterally and rest upon and are secured, as by welding, to the top wall 14 of a boxlike support 15. The latter has an open end facing away from the scoop 10, an end wall 16 adjacent the latter, a bottom wall 17 resting upon the base surface, and opposed side walls 18. The support 15 is reinforced adjacent the scoop 10 by an angle member 15'.

The forward end portions of the rails 13 are secured together by a plate 19 which extends into a notch in each of a pair of vertically disposed plates 20 having the lower edge thereof resting on the top wall 14 of the support 15, all as more particularly shown in Fig. 3. The plates 20 constitute a latch mounting and is braced by a transversely extending triangularly shaped plate 21. A latch member 22 extends between the plates 20 and is pivoted thereto by a pin 23, this member being notched to engage the scoop as shown in Fig. 3. The notched portion of the member 23 is received between a pair of triangular plates 24 secured to an angular member 25 extending transversely of the scoop and reinforcing the latter at that portion thereof received in the notched portion of the latch member.

The scoop 10 carries a rod 26, each end of which is rotatably received in an opening in an adjacent arm 27 secured to the support 15 to thereby pivotally attach the scoop to the frame structure. When the device is elevated from the Fig. 2 position to the Fig. 1 position, the latch member 22 retains the scoop 10 in a position parallel with the base surface and upon release of the latch by rotation thereof by a pull exerted thereon through the cord 28, the scoop rotates to a position inclined with respect to the base surface as shown in full lines in Fig. 1. The latch is yieldably urged into its latching position by a spring 29. When the latch is released from engagement with the scoop, rotation thereof under the influence of the spring beyond a predetermined position is prevented by a pin 29' swingably mounted with the latch 36 and engageable with the forward end of the plates.

The frame is supported intermediate the support 15 and the rearward ends of the rails 13 by a leg structure 30 pivoted to the rails by a pin 31, and the converging latter ends of the rails are secured together by a bottom plate 32 welded thereto. An upright I-beam 33 is seated upon and welded to the intermediate I-beam 13 and is braced by a corresponding beam 34. The upright 33 has a protuberance 35 extending from the rear face thereof and a latch member 36 pivotally supported thereon by a pin 37. As shown in Fig. 7, the latch member 36 has an angularly shaped slot 38 therein in which the pin 37 is accommodated. When the pin 37 is in the vertical portion of the notch 38 the latch 36 is retained against shifting in the direction of its length relative to the pin 37, but upon raising of one end of the latch sufficiently to cause the pin 37 to register with the horizontal portion of the notch 38 the latch can be bodily shifted to the right as viewed in Fig. 7 for the purpose hereinafter illustrated.

The foregoing device is particularly adapted for operation by an industrial truck 40 of the type having a vertically movable platform 41, the operation and construction of the truck and platform being well known and the details thereof are therefore omitted here. Suffice it to say, the platform has a range of movement between a low position immediately adjacent the chassis part 42 and a high position as shown in Fig. 1.

The material handling device when in its Fig. 2 position is so spaced from the base surface by the supports 15 and 30 as to accommodate insertion of the platform therebeneath when the latter is in its aforesaid low position. The platform is aligned longitudinally with the device and then moved thereunder, the front end of the platform rotating the leg structure 30 in a clockwise direction to a non-supporting position between the spaced rails 13, so that this end of the platform 41 extends into the box-like support 15 and abuts the end wall 16 thereof. In this manner the frame structure 12 is seated upon the horizontal portion of the platform and the rearward ends of the rails 13 and the upright 33 abut the vertical portion of the platform. Thus, thrust is imparted to the device for movement thereof in a direction parallel to the base surface by the engagement of the end of the platform with wall 18 of the support 15 and by the engagement of the vertical portion of the platform with the rearward end of the rails 13, although if desired such thrust may be imparted wholly by one of the aforesaid engagements.

When the frame structure 12 is properly seated upon the platform 41 the protuberance 35 registers with and is received in an opening in the front face of the vertical portion of the platform, it being noted that the scoop 10 projects forwardly of the horizontal portion of the platform 41. Tendency of the device to tilt relative to the platform about a transverse axis is opposed by engagement of the protuberance with the wall bounding the opening 43. The latch member 36 is notched to receive the free edge of the vertically disposed portion of the platform and to thereby prevent undesired separation of the truck and device longitudinally. The angular notching of the latch member 36 and the resulting shifting of the latter relative to its supporting pin 37 facilitates the aforesaid latching engagement with and disengagement from the platform and particularly so where the edge of the latter to be received in the latch notch is slightly offset from the main plane of the part of the platform. Undesired lateral shifting of the forward portion of the device relative to the platform is prevented by the side walls 18 of the box-like support 15.

In operation of the device by the truck 40, the scoop 10 is moved along a base surface into a stock pile of the material to be handled for loading and the platform 41 is then elevated to the desired height and the load transported to the intended destination. When the material is to be deposited in a receptacle, such as illustrated at 44, the scoop is brought into registration with the latter, as illustrated by the dotted line showing in Fig. 1, and the latch member 22 is then released to accommodate swinging of the scoop to the full line position for unloading, rotation of the latch under the influence of the spring 29 being limited to its dotted line position by engagement of the pin 29' with the supports 20 as aforesaid. When thus unloaded the truck is moved away from the receptacle, during which movement the platform 41 is lowered to a position such that the scoop is dragged over the top edge of the receptacle and thereby rotated in a clockwise direction, as shown in Fig. 1, against the arcuate edge of the latch 22 to rotate the latter sufficiently to accommodate return of the scoop to its normal load receiving position and engagement of the latch therewith under influence of the spring 29.

In disengaging the truck from the device the platform is disposed in its lower position, the support 15 and scoop 10 engaging the base surface, and the latch 36 released from engagement with the platform. The truck is then moved in a direction longitudinally of the rail 13 to withdraw the platform from beneath the latter, engagement of the scoop 10 and support 15 with the base surface retaining the device against movement with the platform. As the truck is thus moved the leg structure 30 is returned to its illustrated supporting position. The operator of the truck need not dismount to operatively engage the truck with the device inasmuch as the latter is positioned for receiving the truck when disengaged therefrom.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. A scoop shovel adaptation for an industrial truck of the type having a vertically movable platform, comprising a main frame structure adapted to seat upon said platform, spaced supports positioning said structure in spaced relation to the floor surface to accommodate insertion of the platform beneath said structure, one of said supports being fixed relative to said frame structure and so disposed as to receive an operating thrust from an end of said platform and another of said supports being pivotally attached to said frame structure and disposed for movement from its supporting position by said platform as the latter is inserted beneath said frame structure, a scoop member pivoted on the forward end of said frame structure, latch mechanism releasably holding said scoop member in a load receiving position substantially in alignment with the longitudinal axis of the frame structure and truck and adapted when released to accommodate pivotal movement of said scoop member to a load discharging position, and means coacting with said platform and said frame structure adapted to oppose tilting of the latter about an axis transverse to the platform and truck.

2. A scoop shovel adaptation for an industrial truck of the type including a vertically movable platform having a horizontally disposed part and a vertically disposed part, comprising a frame structure adapted to seat upon the horizontally disposed part of said platform when the latter is inserted therebeneath, support means for positioning said frame structure in spaced relation to a floor surface to accommodate insertion of the horizontally disposed part of said platform beneath said frame structure, said frame structure when seated as aforesaid being adapted to abut said vertically disposed platform part for receiving an operating thrust therefrom to thereby move said structure in a direction parallel with respect to said floor surface, means cooperating with said platform vertically disposed part and said frame structure for releasably retaining the latter and said platform against relative separation, and a scoop member pivoted on the forward end of said frame structure.

3. A scoop shovel adaptation for an industrial truck of the type including a vertically movable platform having a horizontally disposed part and a vertically disposed part, comprising a frame structure adapted to seat upon the horizontally disposed portion of said platform, support means for positioning said frame structure in spaced relation to a floor surface to accommodate insertion of the horizontally disposed part of said platform beneath said frame structure, said support means including a relatively fixed support member adapted to abut an end of said horizontally disposed part of said platform for receiving thrust therefrom to thereby move said frame structure in a direction parallel with respect to said floor surface, said frame structure including a portion adapted to abut the vertically disposed part of said platform for receiving a thrust therefrom for moving said frame structure as aforesaid, a scoop member pivoted on the forward end of said frame structure, and latch mechanism detachably holding said scoop member substantially aligned with the axis of the frame structure and truck.

4. In a material handling device adapted for operation by an industrial truck comprising a vertically movable platform including a horizontal portion and a vertical portion having an opening therein; a frame structure including a horizontal part adapted to be seated on the horizontal portion of said platform for movement therewith, an upright fixed at one end of said structure adapted for alignment with the vertical portion of said platform and having a projection adapted to be received in said opening for opposing tilting of the frame structure about an axis transverse to the platform and truck, a latch member carried by said upright adapted to detachably engage said vertical platform portion for opposing relative separation of the platform and frame structure, support means positioning said frame structure in spaced relation to a base surface for accommodating insertion of the horizontal portion of said platform beneath said frame structure, a portion of said frame structure being adapted to abut the vertical portion of said platform when said horizontal platform is inserted beneath said frame structure as aforesaid for receiving an operating thrust therefrom to thereby move said frame structure in a direction parallel with respect to said base surface, a scoop at the other end of said frame structure, means securing said scoop to said frame structure for vertical movement with the latter and for swinging movement between a position substantially in alignment with the longitudinal axis of the frame and truck for loading said scoop and a second position for unloading of said scoop by gravity, and latch mechanism detachably retaining said scoop in the first mentioned position during vertical movement thereof in one direction.

5. In a material handling device adapted for operation by an industrial truck comprising a vertically movable platform including a horizontal portion and a vertical portion, a frame structure adapted to seat on said horizontal part for movement therewith, an upright fixed at one end of said frame structure, means adapted to cooperate with said upright and said vertical portion for releasably retaining said frame structure and said platform against relative separation, support means positioning said frame structure in spaced relation to a base surface for accommodating insertion of said platform beneath said frame structure for seating of the latter as aforesaid, said support means including a support fixedly carried by said frame structure and including spaced side walls adapted to receive said horizontal platform portion therebetween and cooperating to limit lateral shifting of said frame structure relative to said platform, a scoop at the other end of said frame structure, means securing said scoop to said frame structure for movement therewith, said securing means accommodating swinging movement of said scoop relative to said frame structure between a loading position generally parallel with respect to said base surface and a load discharging position declined with respect to said base surface, and latch mechanism operable to detachably retain said scoop in the first mentioned position during vertical movement thereof in one direction.

6. In a material handling device adapted for operation by an industrial truck comprising a vertically movable platform including a horizontal portion and a vertical portion, a frame structure adapted to seat on said horizontal portion for movement therewith, an upright fixed at one end of said frame structure, means adapted to cooperate with said upright and said vertical portion for releasably retaining said frame structure and said platform against relative separtion, support means positioning said frame structure in spaced relation to a base surface for accommodating insertion of said platform beneath said frame structure for seating of the latter as aforesaid, said support means including a support fixedly carried by said frame structure and including spaced side walls adapted to receive said horizontal platform portion therebetween and cooperating to limit lateral shifting of said frame structure relative to said platform, said support member further including an end wall connected with said side walls and adapted to abut an end of said horizontal platform when the latter is inserted beneath said frame structure and to receive thrust therefrom for moving said frame structure in a direction parallel with respect to said base surface, a scoop at the other end of said frame structure, means securing said scoop to said frame structure for movement therewith, said securing means accommodating swinging movement of said scoop relative to said frame structure between a loading position generally parallel with respect to said base surface and a load discharging position declined with respect to said base surface, and latch mechanism operable to detachably retain said scoop in the first mentioned position during vertical movement thereof in one direction.

7. A scoop shovel adaptation for an industrial truck including a vertically movable platform having a horizontal portion and a vertical portion, comprising a main frame structure adapted to seat upon said horizontal platform portion and to abut said vertical platform portion for receiving thrust therefrom to propel said frame structure in a direction parallel to the base surface, support means positioning said structure in spaced relation to the base surface for accommodating insertion of the horizontal platform portion beneath said structure, said means comprising a supporting member having spaced side walls adapted to receive said horizontal platform portion therebetween and a connecting end wall adapted to abut an end of said horizontal platform portion for receiving thrust therefrom to propel said structure as aforesaid, laterally spaced arms respectively carried by said spaced side walls, means carried by said frame structure adapted to cooperate with the vertical portion of said platform for releasably retaining said structure seated on the latter as aforesaid, a scoop member at the forward end of said frame pivotally secured to said arms, and latch mechanism releasably positioning said scoop member substantially in alignment with the longitudinal axis of said frame structure and adapted when released to accommodate pivotal movement of the latter member from said position.

ADELBERT G. HAZEN.